E. B. CLARK.
DRILLING APPARATUS.
APPLICATION FILED JUNE 14, 1909.
1,018,096.
Patented Feb. 20, 1912.
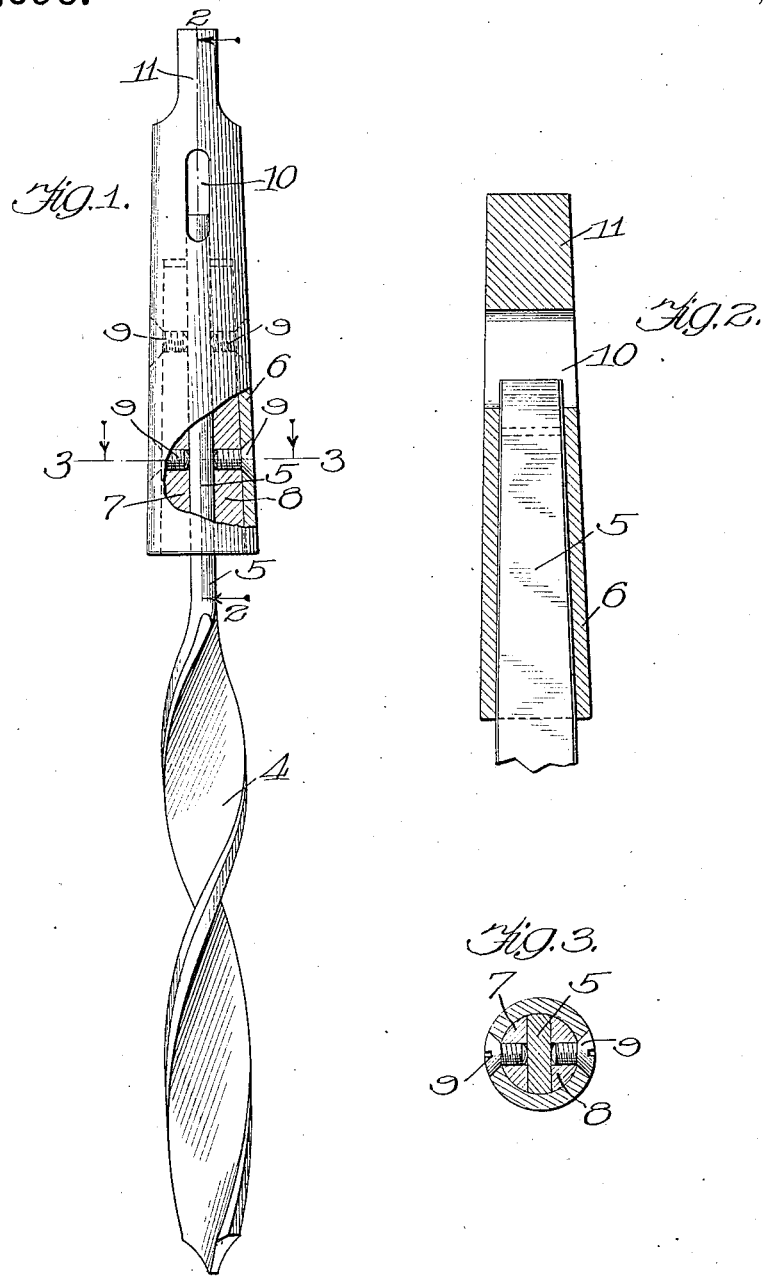

UNITED STATES PATENT OFFICE.

EUGENE B. CLARK, OF CHICAGO, ILLINOIS, ASSIGNOR TO CELFOR TOOL COMPANY, OF CHICAGO, ILLINOIS, A CORPORATION OF ILLINOIS.

DRILLING APPARATUS.

1,018,096.  Specification of Letters Patent.  Patented Feb. 20, 1912.

Application filed June 14, 1909. Serial No. 502,150.

*To all whom it may concern:*

Be it known that I, EUGENE B. CLARK, a citizen of the United States, residing at Chicago, in the county of Cook and State of Illinois, have invented certain new and useful Improvements in Drilling Apparatus, of which the following is a specification, reference being had to the accompanying drawings.
My invention relates to drilling mechanism, and particularly to drills made of high-speed steel.

It has for its object to provide a new and improved construction by which the quantity of expensive high-speed steel used may be reduced to the minimum without impairing the strength and efficiency of the drill, and also to provide a construction by which the drilling apparatus may be employed in situations which do not permit of the use of the chuck heretofore generally employed for holding the drill proper. For example, in multiple spindle drilling machines it is frequently necessary to bring the drills closer together than the diameter of the chucks will permit, and by my invention I provide a construction which permits the drills to be set as close together as may be desired.

I accomplish this object as illustrated in the drawings and as hereinafter described.

What I regard as new is set forth in the claims.

In the accompanying drawings,—Figure 1 is a view of my improved drilling apparatus, some parts being in section; Fig. 2 is a longitudinal section on line 2—2 of Fig. 1; and Fig. 3 is a cross-section on line 3—3 of Fig. 1.

Referring to the drawings,—4 indicates the drill proper, which is made of a bar of high-speed steel, the greater portion of which is twisted to form the drilling portion, leaving a flat shank 5 at one end. The shank 5 of the drill is flattened on both sides, as shown in Fig. 3, its edges being tapered toward the upper or outer end thereof, as best shown in Fig. 2.

6 indicates a holder or separable shank, which is made of relatively low-grade steel bored at one end to a taper corresponding with the tapered edges of the shank 5 of the drill proper, so that when the shank 5 is fitted into the socket of the separable shank 6 its tapered edges conform to and fit closely in the bore of the said separable shank.

7—8 indicate segmental blocks or distance-pieces, which are fitted in the bore of the separable shank 6 so as to lie at opposite sides of the flat shank 5, fitting closely thereagainst, as shown in Fig. 3. Said distance-pieces are semi-cylindrical and tapered, as shown, and are secured in the bore in the separable shank in any suitable way, as by screws 9, as shown in Fig. 3 and indicated by dotted lines in Fig. 1. Thus, when the flat shank 5 is fitted into the bore of the separable shank, it is held firmly and non-rotatably in position. Preferably I provide the separable shank 6 with a transverse drift-hole or passage 10 for driving the drill proper out of the bore of the separable shank. The upper or outer end of the separable shank is flattened, as shown at 11, to engage the socket in the drilling machine, or other appliance to which the drill as a whole is attached for operating it.

It will be noted that by the construction described I am able to reduce the thickness of the shank 5 to the minimum, and as the material of which it is composed is expensive high-speed steel, a considerable saving is thus effected. This, however, does not impair the efficiency or strength of the drill, as it is held securely by the broad and extended bearing surfaces provided in the separable shank at the sides of the drill and also by the engagement of the beveled edges of the shank 5 with the bore of the separable shank, as above described. Furthermore, the diameter of the separable shank is substantially the same as or slightly greater than the drill proper, and consequently, if desired, the drills may be set very close together in drilling machines. After the drill proper has been fitted to the separable shank, it is not ordinarily detached therefrom until it is worn out or broken, when the parts may be separated and the separable shank again employed in connection with another drill proper,—thus effecting further economy in the use of the drill. It will be understood, of course, that each drill will originally be provided with its own separable shank,— the complete tool comprising the drill proper and the separable shank.

That which I claim as my invention, and desire to secure by Letters Patent, is,—

1. A drilling apparatus, comprising a drill proper having an integral shank provided with opposite plane side faces and tapered edges, and a separable shank provided with a tapered bore in which the edges of said integral shank fit and having tapered distance blocks which fit closely and are secured within said bore at opposite sides thereof, said distance blocks having plane faces which engage the plane side faces of said integral shank.

2. A drilling apparatus, comprising a drill proper having an integral shank provided with opposite plane side faces and tapered edges, and a separable shank provided with a tapered bore in which the edges of said integral shank fit and having tapered distance blocks fitted in said bore at opposite sides thereof and detachably secured to the separable shank, said distance blocks having plane faces which engage the plane side faces of said integral shank and curved faces which fit the bore.

EUGENE B. CLARK.

Witnesses:
JOHN L. JACKSON,
MINNIE A. HUNTER.

---

Copies of this patent may be obtained for five cents each, by addressing the "Commissioner of Patents, Washington, D. C."